US009114357B2

(12) United States Patent
Block et al.

(10) Patent No.: US 9,114,357 B2
(45) Date of Patent: Aug. 25, 2015

(54) TREATMENT OF NITROGEN OXIDES IN FLUE GAS STREAMS

(71) Applicant: PeroxyChem LLC, Philadelphia, PA (US)

(72) Inventors: Philip A. Block, Garnet Valley, PA (US); Timothy Holtz, N. Tonawanda, NY (US); Elena Pisanova, Amherst, NY (US); John M. Rovison, Jr., Sanborn, NY (US)

(73) Assignee: PeroxyChem LLC, Philadelphia, PA (US)

( * ) Notice: Subject to any disclaimer, the term of this patent is extended or adjusted under 35 U.S.C. 154(b) by 0 days.

(21) Appl. No.: 14/486,395

(22) Filed: Sep. 15, 2014

(65) Prior Publication Data
US 2015/0078978 A1    Mar. 19, 2015

Related U.S. Application Data

(63) Continuation-in-part of application No. 14/026,338, filed on Sep. 13, 2013, now abandoned.

(51) Int. Cl.
*B01D 53/56* (2006.01)

(52) U.S. Cl.
CPC .............. *B01D 53/56* (2013.01); *B01D 53/565* (2013.01)

(58) Field of Classification Search
CPC .............................. B01D 53/56; B01D 53/565

USPC .......................................................... 423/235
See application file for complete search history.

(56) References Cited

U.S. PATENT DOCUMENTS

| 4,119,702 | A | 10/1978 | Azuhata et al. |
| 4,213,944 | A | 7/1980 | Azuhata et al. |
| 4,783,325 | A | 11/1988 | Jones |
| 5,120,508 | A | 6/1992 | Jones |
| 5,151,258 | A | 9/1992 | Gubanc et al. |
| 5,670,122 | A | 9/1997 | Zamansky et al. |
| 6,676,912 | B1 | 1/2004 | Cooper et al. |
| 8,147,785 | B2 | 4/2012 | Pfeffer et al. |
| 2012/0141346 | A1 | 6/2012 | Pfeffer et al. |
| 2015/0078978 | A1* | 3/2015 | Block et al. ............... 423/239.1 |

FOREIGN PATENT DOCUMENTS

| JP | 57-87816 | 6/1982 |
| JP | 08-332341 | 12/1996 |
| JP | 2006-110526 | 4/2006 |
| KR | 10-0197287 | 6/1999 |
| KR | 10-2002-0031426 | 5/2002 |

OTHER PUBLICATIONS

International Search Report and Written Opinion issued on Mar. 19, 2015 for corresponding PCT Application No. PCT/US2014/055630.
(Continued)

*Primary Examiner* — Timothy Vanoy
(74) *Attorney, Agent, or Firm* — Duane Morris LLP (57) ABSTRACT

A method for removing nitrogen oxides in stationary source combustion flue gas streams includes introducing a reagent or a mixture comprising carbamide peroxide and water as a reducing agent.

16 Claims, 4 Drawing Sheets

(56) References Cited

OTHER PUBLICATIONS

Zamansky et al., "Removal of Multiple Air Pollutants by Gas-Phase Reactions of Hydrogen Peroxide," in Preprints of Papers, American Chemical Society (ACS), Div. of Fuel Chemistry; Journal vol. 40; Issue No. 4; Conference 210, Natl. Meeting of the ACS, Chicago, IL, Aug. 20-25, 1995, pp. 1039-1044.

Cooper, D.A., "The influence of ammonia and hydrogen peroxide addition on NO (Nitrogen Oxide) emissions in the flue gas channel of a 16 MW coal-fired fluidized bed combustor," Journal of the Institute of Energy, Jun. 1988, p. 78-84.

Javed, Tayyeb, M., "Control of combustion-generated nitrogen oxides by selective non-catalytic reduction," Journal of Environmental Management, 83 (2007) p. 251-289.

* cited by examiner

TREATMENT OF NITROGEN OXIDES IN FLUE GAS STREAMS

PRIORITY CLAIM AND CROSS-REFERENCE

This application claims the benefit of U.S. application Ser. No. 14/026,338, filed Sep. 13, 2013, which application is expressly incorporated by reference herein in its entirety.

FIELD OF THE INVENTION

The present invention relates to the treatment of a combustion flue gas stream from a stationary source to remove nitrogen oxide (NO) before the gas stream is released into the atmosphere.

BACKGROUND OF THE INVENTION

Combustion of fuels such as coal, coke, natural gas or oil typically results in the presence of pollutants in the combustion flue gas stream resulting from the combustion process or derived from impurities present in the fuel source. Electric utility power plants that burn coal are a significant source of such combustion process air pollutants, but other stationary fuel-burning facilities such as industrial boilers, waste incinerators, and manufacturing plants are also pollution sources.

The primary air pollutants formed by these stationary high temperature combustion sources are sulfur oxides (e.g. $SO_2$ and $SO_3$), also called $SO_X$ gases, and nitrogen oxides, also called $NO_X$ gases, both of which are acid gases. Other combustion pollutants of concern in these combustion flue gases include other acid gases such as HCl and HF, Hg (mercury), $CO_2$ and particulates. These individual pollutant components from stationary combustion sources have been subject to increasingly more stringent regulatory requirements over the past three decades, and emission standards are likely to be tightened in the future.

The removal or significant reduction of $SO_X$ and $NO_X$ contaminants, as well as other acid gases and elemental mercury, requires an integrated air pollution control system. Such integrated air pollution control systems represent a particular challenge in situations requiring retrofitting of first-time or additional or enhanced pollution control measures, e.g., older coal-fired electric power plants without any desulfurization measures or power plants with $SO_X$ controls requiring modifications for control of $NO_X$ gas emissions.

Nitrogen oxide or nitric oxide (NO) and smaller amounts of nitrogen dioxide ($NO_2$) are the normal constituents of $NO_X$ contaminants formed in the combustion of fossil fuels like coal, coke and oil. The presence of $NO_X$ in a flue gas stream discharged to the atmosphere can result in a "brown plume" and is a contributor to ground-level ozone pollution ("smog") and to acidifying nitrate deposition.

The wet scrubbing desulfurization techniques utilized for $SO_X$ removal from combustion flue gas are largely unsuccessful for removal of NO that is also present since the latter has low water solubility and is not amenable to aqueous alkali desulfurization scrubbing techniques. Although $NO_X$ formation can be controlled to some extent by modifying combustion conditions, current techniques for $NO_X$ removal from combustion flue gas normally utilize post-combustion treatment of the hot flue gas by Selective Catalytic Reduction (SCR) or Selective Non-Catalytic Reduction (SNCR)

The Selective Catalytic Reduction procedure utilizes a catalytic bed or system to treat a flue gas stream for the selective conversion (reduction) of $NO_X$ to $N_2$. The SCR procedure normally utilizes ammonia or urea as a reactant that is injected into the flue gas stream upstream, prior to their being contacted with the catalyst. SCR systems in commercial use typically achieve $NO_X$ removal rates of 80-90%, but improved catalyst systems reportedly provide over 90% removal rates.

The Selective Non-catalytic Reduction procedure is analogous to SCR except that no catalyst is employed in the treatment of a flue gas stream with ammonia or urea for the selective reduction of $NO_X$ to $N_2$. High treatment temperatures are required for the reduction reaction in SNCR, in the absence of the catalysts used in SCR systems. SNCR systems are favored for retrofit of smaller electric power utility plants because of their simplified installation and modest equipment requirements. Drawbacks to commercial SNCR systems are their requirement of very high and narrow temperature ranges to effect conversion of $NO_X$ to N, which often results in undesirable reaction byproducts, and their $NO_X$ removal rates of only 30-70%.

Many individual approaches are described in the prior art for the removal of specific $SO_X$ and $NO_X$ components. In actual commercial practice, the engineering challenge is the design of an integrated air pollution control system that can be retrofitted to existing fossil-fuel fired electric utility plants that are in need of updated or upgraded pollution controls for one or more of $SO_2$, $SO_4$, NO, $NO_2$, Hg, HCl, HF, $CO_2$ and particulates. Since individual electric utility plants are rarely alike, retrofit systems need to be adaptable to the specific requirements and needs of the electric utility plant being modified.

The present invention provides an air pollution retrofit system that is particularly well suited to (but not limited to) improving the performance of removing $NO_X$ in SNCR-treated combustion flue gas streams, utilizing a $NO_X$ reduction reagent. The novel $NO_X$ treatment system of this invention is not taught in prior art treatments for abating $SO_X$ and $NO_X$ contaminants in combustion flue gas streams.

U.S. Pat. No. 4,213,944 of Azuhata et al. (Hitachi) discloses a process for removing nitrogen oxides from a hot gas stream containing the same by adding a reducing agent, preferably ammonia, and hydrogen peroxide into hot gas stream at a temperature of 400-1200° C. to decompose the nitrogen oxides to nitrogen gas and water. The hydrogen peroxide is added concurrently with the ammonia and is said to increase the activity of the ammonia, particularly at gas temperatures of 400-800° C., by decomposing the ammonia to make it reactive with the $NO_X$. Sufficient hydrogen peroxide is added with the ammonia so that excess unreacted ammonia is also decomposed.

A $NO_X$ treatment technique analogous to that described in the Azuhata patent involves treatment of a combustion flue gas containing $NO_X$ with ammonia and hydrogen peroxide and is described by D. A. Cooper in "The Influence of Ammonia and Hydrogen Peroxide Addition on NOx Emissions in the Flue Gas Channel of a 16 MW Coal-fired Fluidised Bed Combustor," Journal of the Institute of Energy, vol. 61, no. 447 (1988), pp. 78-84.

U.S. Pat. Nos. 5,120,508, and 4,783.325 of Jones (Noell) disclose methods of converting NO to $NO_2$ in a flue gas stream by injecting a gas containing a peroxyl initiator and oxygen into the NO-containing gas stream. The peroxyl initiator is preferably propane but may also be other hydrocarbons or hydrogen peroxide or hydrogen. The resultant $NO_2$-containing gas stream is then treated in an absorption section to remove $NO_X$ and $SO_X$ with a dry sorbent such as nahcolite or trona, the dry sorbent being captured in a baghouse before the treated gas stream is discharged to the atmosphere.

U.S. Pat. No. 5,670,122 of Zamansky et al. (Energy & Environmental Research) discloses a method for removing NO, $SO_3$, CO, light hydrocarbons and mercury vapor (Hg) from combustion flue gas by injecting into the gas stream atomized droplets of either hydrogen peroxide or a mixture of hydrogen peroxide and methanol, to convert the respective gas contaminants to $NO_2$, $SO_2$, $CO_2$ (for the CO and light hydrocarbons) and HgO. The treatment is carried out at a gas temperature of about 377° C. to about 827° C., and the reaction products are subsequently removed in a downstream scrubbing operation. The treatment also may be carried out in combination with SNCR $NO_X$ reduction technology, with the SNCR-treated combustion gas stream being treated downstream with the $H_2O_2$ or $H_2O_2/CH_3OH$ injection treatment. The method is also described by Zamansky et al. in Preprints of Papers, American Chemical Society (ACS), Div. of Fuel Chemistry; Journal Vol. 40; Issue No. 4; Conference 210, Natl. Meeting of the ACS, Chicago, Ill., 20-25 Aug. 1995, pp. 1039-1044.

U.S. Pat. No. 6,676,912 of Cooper et al. (NASA) discloses a method of removing NO from stationary combustion gas streams by injection of $H_2O_2$ into the gas stream to oxidize NO to $NO_2$ and $HNO_3$ and $HNO_2$, which species are more readily recovered via aqueous wet scrubbing. The nitrogen acids and residual $NO_2$ are then removed via wet scrubbing with water or an aqueous alkaline medium or via passage of the flue gas stream through a particulate alkaline sorbent in a baghouse. The method may optionally include a preliminary flue gas desulfurization scrubbing step to remove $SO_2$, prior to the $H_2O_2$ injection. U.S. Pat. No. 6,676,912 of Cooper et al. is hereby incorporated by reference for its disclosures about the reaction of $H_2O_2$ and $NO_X$ and related reactions.

U.S. Pat. No. 8,147,785 of Pfeffer et al. (FMC) describes a method for removing residual unreacted ammonia (ammonia slip) that is present in a combustion flue gas stream that has been treated via SCR or SNCR $NO_X$ treatment systems using ammonia or urea. The flue gas stream is treated downstream of the SCR or SNCR operation with aqueous hydrogen peroxide to remove residual unreacted ammonia.

The present invention provides a method for the removal of $NO_X$ in a SNCR system that enables the removal of $NO_X$ from the gas stream at reduced operating temperatures and that does not require use of ammonia as reducing agent.

SUMMARY OF THE INVENTION

In accordance with the present invention, nitrogen oxides are removed from a flue gas stream in a method comprising introducing a reagent or a mixture comprising carbamide peroxide and water into a stationary-source $NO_X$-containing combustion flue gas stream at a temperature between about 300° C. to about 800° C. The reagent or the mixture is in an amount sufficient to react with nitrogen oxides ($NO_X$) such as NO in the flue gas stream, to yield a flue gas stream having a reduced concentration of nitrogen oxides ($NO_X$) such as NO.

BRIEF SUMMARY OF THE DRAWINGS

FIG. 1 shows concentrations of NO, $NO_2$ and NO+$NO_2$ ($NO_X$) in the $H_2O_2$-treated gas stream as a function of time during the study.

FIG. 2 shows concentrations of NO, $NO_2$ and NO+$NO_2$ ($NO_X$) in the carbamide peroxide treated gas stream as a function of time during the study.

DETAILED DESCRIPTION OF THE INVENTION

The present invention is a treatment method for removing nitrogen oxides ($NO_X$) from a combustion flue gas stream from a stationary combustion source, e.g., an electric power plant generating facility, by conversion of the nitrogen oxides, particularly NO, to water and nitrogen gas using a two component reagent that serves as the reducing agent.

The invention is particularly useful for effecting the conversion (reduction) of nitrogen oxides at relatively low temperatures, without the need for a catalyst such as is typically used in SCR operations to effect reduction of $NO_X$. The $NO_X$ treatment method of this invention accomplishes this objective using a reagent that is urea in combination with hydrogen peroxide such as carbamide peroxide, in the absence of a catalyst, such as the catalysts typically utilized in SCR operations. Carbamide peroxide [$(NH_2)_2CO \cdot H_2O_2$] is a solid adduct of 1 mole of Hydrogen peroxide with 1 mole of urea. The reagent comprising carbamide peroxide and water is injected or otherwise introduced into a flue gas containing $NO_X$ such as NO to effect removal (conversion) of a substantial portion of the $NO_X$ in the treated gas stream, as is described in more detail below. The reagent can comprises a mixture (such as a solution or a slurry) of carbamide peroxide and water prepared before introduced into a flue gas containing $NO_X$. The mixture can further comprise additional urea or hydrogen peroxide. The carbamide peroxide and the water can be also introduced separately and concurrently into the flue gas stream, as a first stream containing solid carbamide peroxide and a second stream containing water.

The invention is particularly useful for modifying the operation of conventional Selective Non-Catalytic Reduction reactor systems to be adapted to operation at reduced temperature ranges, e.g., below 800° C., using the urea-based reagent of this invention instead of ammonia as the reducing agent.

Combustion Flue Gas Stream

The combustion flue gas stream exiting the combustion zone of a stationary source contains a variety of components that are desirably reduced or removed from the flue gas prior to its being discharged to the atmosphere, among which are the $NO_X$ components treated according to the present invention. The precise composition of the combustion flue gas depends primarily on the nature of the fuel and on the furnace design and operating parameters. For example, the fuel may be, e.g., coal, oil, coke or natural gas, etc., and in the case of coal, coal may be high sulfur or low sulfur, bituminous or anthracite, etc.

A representative flue gas stream obtained from combustion of high sulfur coal containing 2.5 wt. % sulfur, burned using 10% excess air, has the composition shown in Table 1.

TABLE 1

Flue Gas Composition

| Component | Concentration: volume basis |
|---|---|
| NO | 350-400 parts per million (ppm) |
| $NO_2$ | 10-20 ppm |
| $SO_2$ | 0.22% |
| $SO_3$ | 20 ppm |
| $H_2O$ | 9% |
| $CO_2$ | 15% |
| Hg | 1 part per billion (ppb) |
| Other Gases | 76% |

The NO concentration in the flue gas stream is typical of that expected from the burning of high sulfur coal in a furnace that is not equipped with low $NO_X$ burners. The $NO_2$ concentration typically represents about 5% of the total $NO_X$. The $SO_2$ concentration in the flue gas stream is relatively high, as would be expected from the burning of high sulfur coal. The $SO_3$ concentration is typically only about 1% of the $SO_2$ concentration.

The foregoing flue gas composition is simply meant to be illustrative of a typical combustion flue gas stream. The present invention is adapted to be used with a wide range of different flue gas compositions from a variety of stationary sources and air pollution control systems, within the parameters described in more detail below for the method of this invention.

Carbamide Peroxide Reagent

The $NO_X$ treatment method of the present invention involves use of carbamide peroxide, in combination with water, as the reagent to effect reduction of $NO_X$ compounds present in the flue gas stream being treated.

The reagents, carbamide peroxide and water, are injected or otherwise introduced into the flue gas stream, preferably in aqueous form, e.g., as an aqueous solution or an aqueous slurry.

The reagent components are preferably combined prior to their injection or introduction into the flue gas stream. Alternatively, the carbamide peroxide and water components may be introduced separately but concurrently into the flue gas stream being treated provided that good mixing of the two reagent components is ensured. In some embodiments, the carbamide peroxide component can be used in dry powder form when introduced into the flue gas stream.

For purposes of the present specification, the term aqueous reagent solution should be understood as meaning that the reagent components that are normally solids (urea or carbamide peroxide) are totally solubilized in the aqueous solution. The term aqueous reagent slurry, on the other hand, should be understood as meaning that the reagent components that are normally solids (urea or carbamide peroxide) may only be partially solubilized and that a portion of such solids are suspended as solids (preferably as finely-divided particulates) in the aqueous slurry. The terms aqueous reagent medium and aqueous medium should be understood to include or encompass both solutions and slurries.

Carbamide peroxide is a solid adduct, which contains both urea and hydrogen peroxide, present in a 1:1 molar ratio.

Carbamide peroxide is preferably injected or introduced into the flue gas stream in aqueous form, e.g., as an aqueous solution. The solubility of carbamide peroxide in water is relatively high, e.g., about 50 g. carbamide peroxide/100 ml, water at 20° C.

Alternatively, carbamide peroxide may be introduced as a solid into the flue gas stream, e.g., as a finely-divided particulate solid or powder, or as a concentrated aqueous slurry containing carbamide peroxide that is only partially solubilized in the aqueous medium.

The particulate solid (carbamide peroxide in an aqueous medium or carbamide peroxide injected as a solid) should have a relatively small particle size in order to maximize the surface-to-volume ratio, a factor that can enhance the effectiveness of the gas-solid interaction between the $NO_X$ and solid and between the hydrogen peroxide and solid. The mean particle size of the particulate solid is preferably be less than about 100 μm, more preferably less than about 70 μm, and most preferably less than about 40 μm.

The advantages of carbamide peroxide as a component in the reagent employed in this invention are numerous. Carbamide peroxide is a solid, inert, non-corrosive material. It is easily handled and safely stored. It provides a stable molar ratio $H_2O_2$:Urea=1:1 in the flue gas at any concentration used. This ratio was found optimal for $NO_X$ (e.g., NO) reduction.

The second important component of the reagent composition is water. It is known that water participates in the radical reaction initiated by hydrogen peroxide and thus is important for NOx reduction. Thus, the water functions as an active component in the reaction and not simply a carrier or a solute The concentration of water can vary, but the molar ratio of water to carbamide peroxide in the aqueous solution is preferably maintained within a range of from about 5:1 to about 500:1, and more preferably within a range of from about 50:1 to about 200:1 $H_2O$:carbamide peroxide.

The aqueous reagent solution preferably contains at least 1 wt. % total of the carbamide peroxide, more preferably at least about 3 wt. % total of t carbamide peroxide, and most preferably at least about 5 wt. % carbamide peroxide. Higher total concentrations of the carbamide peroxide in the aqueous reagent solution are feasible, e.g., 10 wt. % or more or even 20 wt. % or more of carbamide peroxide, with the recognition that very high total concentrations (e.g., above 50 wt. %) may exceed the maximum solubility of the carbamide peroxide, resulting in the formation of an aqueous slurry.

Carbamide Peroxide in combination with Urea or $H_2O_2$

The molar ratio of urea to hydrogen peroxide in carbamide peroxide is 1:1. To modify this ratio, solid urea or liquid aqueous solution of $H_2O_2$ can be added to the aqueous solution of carbamide peroxide. For example, the reagent used in this invention can comprise a mixture of carbamide peroxide, water, and urea. The molar ratio of the carbamide peroxide to the urea to the water can be in the range of from about 0.25:1:50 to about 20:1:1000. In some embodiments, the reagent used can comprise a mixture of carbamide peroxide, water, and $H_2O_2$. The molar ratio of the carbamide peroxide to the $H_2O_2$ to the water can be in the range of from about 0.5:1:50 to about 10:1:500.

Urea ($NH_2CONH_2$) is a stable solid at room temperature. Urea is water soluble and may be completely dissolved in water or in aqueous solutions also containing carbamide peroxide, for subsequent injection into a flue gas stream being treated in the method of this invention. The concentration range of such urea—hydrogen peroxide solutions may vary over a relatively wide range, given that the maximum solubility of urea (or carbamide peroxide) in aqueous media is relatively high.

The molar ratio of carbamide peroxide to urea in the aqueous solution is preferably maintained within a range of from about 0.25:1 to about 20:1 carbamide peroxide to urea.

The hydrogen peroxide is preferably utilized as aqueous hydrogen peroxide. It can be added to an aqueous solution of carbamide peroxide, in various proportions, which allows to change the urea to $H_2O_2$ ratio in the reagent used for NOx reduction.

The molar ratio of carbamide peroxide to $H_2O_2$ in the aqueous solution is preferably maintained within a range of from about 0.5:1 to about 10:1 carbamide peroxide to $H_2O_2$.

The molar ratio of urea to hydrogen peroxide in the aqueous solution is preferably maintained within a range of from about 0.1:1 urea:$H_2O_2$ (i.e., 10:1 $H_2O_2$:urea) to about 5:1 urea:$H_2O_2$ (i.e., 1:5 $H_2O_2$:urea), and more preferably within a range of from about 0.2:1 urea:$H_2O_2$ (i.e., 5:1 $H_2O_2$:urea) to about 3:1 urea:$H_2O_2$. The molar ratio of urea to hydrogen peroxide is preferably at least equimolar, 1:1 urea:$H_2O_2$. More preferably, the molar ratio of urea to hydrogen peroxide provides a molar excess of urea relative to the hydrogen peroxide. More preferably the amount of urea present in the aqueous solution provides a molar excess of urea with respect to the hydrogen peroxide, e.g., at least about 1.1 moles urea per 1 mole $H_2O_2$, up to about 3 moles urea per 1 mole $H_2O_2$ and, more preferably, up to about 2:1:urea:$H_2O_2$.

Carbamide peroxide and urea solutions typically have a relatively neutral pH. Aqueous solutions containing both urea and hydrogen peroxide are slightly acidic, e.g., about pH 3.5 to about pH 5.5, which promotes stability of the hydrogen peroxide against decomposition.

Ammonia (the preferred reducing agent in conventional SCR and SNCR $NO_X$ treatment operations), by contrast, lacks many of the advantages associated with urea just mentioned. Ammonia is a corrosive gas and in aqueous solution has a relatively alkaline pH, 11-12. In addition, aqueous solutions that contain both ammonia and hydrogen peroxide are typically unstable, with the hydrogen peroxide being susceptible to decomposition at room temperature due to the alkaline solution pH. Ammonia also has a tendency to react with $SO_3$ in $SO_X$- and $NO_X$-containing flue gas streams, leading to formation of ammonium sulfate, a corrosive and sticky solid salt that can lead to plugging in flue gas stream ductwork.

The concentration of hydrogen peroxide in the aqueous reagent solution (containing urea and hydrogen peroxide) may vary over a wide concentration range, from about 0.5 wt. % to about 50 wt. % $H_2O_2$.

The preferred concentration range for the hydrogen peroxide component in the aqueous reagent solution is desirably in the range of from about 1 wt. % to about 40 wt. % $H_2O_2$, preferably in the range of from about 2 wt. % to about 30 wt. % $H_2O_2$, and more preferably in the range of from about 3 wt. % to about 20 wt. % $H_2O_2$. Most preferably, the hydrogen peroxide component in the aqueous reagent solution is present at a concentration of at least 5 wt. % $H_2O_2$.

The preferred concentration range for the hydrogen peroxide component in the aqueous reagent solution is normally determined indirectly, by the choice of (1) of the urea concentration desired in the aqueous medium (a decision that normally takes into consideration the maximum solubility of urea possible in an aqueous solution). (2) the specific molar ratio of urea:$H_2O$, that is desired for the aqueous reagent solution and (3) the desired total concentration of reagent components in the aqueous reagent solution.

With regard to the third factor just mentioned, another consideration in this decision process is the preference that the aqueous reagent solution not be overly dilute with respect to the total amount of each component present, since highly dilute solutions require evaporation of significantly more water in the flue gas stream. This can lead to cooling of the gas stream and an undesired reduction in the gas stream temperature (i.e., the treatment temperature).

The source aqueous hydrogen peroxide used in the present invention may have a wide range of aqueous solution concentrations, with aqueous solutions preferably containing about 10 wt. % to about 50 wt. % $H_2O_2$ and those containing from about 20 wt. % to about 40 wt. % $H_2O_2$ being more preferred. Aqueous hydrogen peroxide solutions within these concentration ranges are readily available from commercial suppliers, as stabilized $H_2O_2$ solutions.

Concentrations of aqueous $H_2O_2$ above 50 wt. % $H_2O_2$ are feasible but require stringent handling and safety measures and are best avoided for that reason. Concentrations of aqueous $H_2O_2$ below 10 wt. % $H_2O_2$ are likewise feasible but are relatively dilute, requiring relatively larger volumes to provide the same amount of $H_2O_2$ as provided in much smaller volumes of more concentrated aqueous solutions.

The activity of the hydrogen peroxide as a reagent in combination with the urea reagent component may optionally be enhanced or increased, in the present invention, by the use of one or more activators in conjunction with the aqueous hydrogen peroxide. The activator may be added or otherwise introduced into the aqueous solution containing urea and hydrogen peroxide shortly before that aqueous solution is injected into the $NO_X$-containing flue gas stream or may be introduced concurrently with the aqueous reagent solution during the injection procedure, provided that there is good mixing between the two. The activator may alternatively be added to the source aqueous hydrogen peroxide that is used to prepare the aqueous solution containing urea and hydrogen peroxide Activators for hydrogen peroxide include metal ions (e.g., iron, copper, manganese, chromium, nickel), metals (e.g., platinum, silver) and metal compounds (e.g., oxides, hydroxides or sulfides. e.g., of manganese, iron, copper, palladium). A preferred activator is iron and, as is evident for the exemplified metals, transition metals, including the heavy metals, are also preferred. Combinations of metal activators may be used, with iron and copper being a preferred synergistic combination.

Other materials that may be used as hydrogen peroxide activators in the present invention include oxidizing agents such as ozone, hypochlorite (e.g., sodium or calcium hypochlorite), chlorite (e.g., sodium chlorite), chlorate (e.g., sodium, potassium, or magnesium chlorate), and the like.

The hydrogen peroxide activator may be introduced into the aqueous medium containing urea and hydrogen peroxide (or into the source aqueous hydrogen peroxide) in dissolved form or in suspended form. Small amounts of activator, in the range of parts per million, are normally sufficient to enhance the hydrogen peroxide activity.

A noteworthy and surprising aspect of the present invention is that hydrogen peroxide, when used in combination with the urea in the two component reagent employed in this invention, appears not to function as an oxidizer with respect to the $NO_X$ components in the flue gas stream being treated. Hydrogen peroxide, a strong oxidizer, will result in oxidation of NO to $NO_2$ in a flue gas stream containing $NO_X$, if introduced into the gas stream as the sole reagent; see Comparative Example 4, below.

Hydrogen peroxide, when used in combination with urea in the reagent employed in the method of this invention, appears to function as an activator or agent that enhances the reducing functionality of the urea (with respect to the $NO_X$ in the flue gas stream being treated), rather than oxidizing NO present in the gas stream. In addition, the hydrogen peroxide in this unique role enables the urea to provide its desired reducing functionality at much lower flue gas stream temperatures than are conventionally used with urea alone.

Aqueous Reagent Containing Urea and Hydrogen Peroxide

The aqueous reagent medium containing urea and hydrogen peroxide that is employed as the reducing agent in the method of this invention for reaction with $NO_X$ in flue gas streams may be used over a wide range of concentrations, with respect to the total amount of urea and hydrogen peroxide present in the aqueous solution or medium.

With the use of the solid adduct carbamide peroxide as the source of both urea and hydrogen peroxide for the reagent of this invention, the 1:1 molar ratio of urea:$H_2O_2$ provided by carbamide peroxide may be adjusted above or below this equimolar amount via supplemental addition of urea or hydrogen peroxide.

The aqueous reagent solution is preferably within a temperature of about 10° C. to about 50° C., more preferably about 15° C. to about 30° C., prior to its injection or introduction into the flue gas stream. Higher or lower temperatures outside of the preferred range are also feasible, but very low solution temperatures may limit the maximum solubility of urea and very high solution temperatures may result in unwanted decomposition of the hydrogen peroxide, prior to injection of the solution.

Reagent Reaction with $NO_X$

The reaction between $NO_X$, specifically NO, and the urea and hydrogen peroxide in the reagent of this invention is believed to occur as follows:

$$2NO+(NH_2)_2CO+H_2O_2 \rightarrow 2N_2+3H_2O+CO_2 \quad (1)$$

This reduction reaction converts NO to $N_2$ and results in formation of nitrogen ($N_2$), carbon dioxide ($CO_2$) and water ($H_2O$), all gaseous reaction products. These reaction products are gaseous compounds that are typically present in a flue gas stream from a stationary-source combustion source and thus do not introduce any new species or unwanted reaction byproducts into the treated gas stream. As such, the urea and hydrogen peroxide reagent employed in this invention may be considered environmentally friendly.

The amount of reagent introduced into the flue gas stream for reaction with the $NO_X$ present in the gas stream is normally controlled via the flow rate of reagent introduced into the gas stream, to provide the desired amount of urea or hydrogen peroxide relative to the NO to be reacted.

The amount of reagent introduced into the gas stream should provide a minimal concentration of both urea and $H_2O_2$ in the gas stream of at least 100 ppm, and minimal concentration of water vapor in the gas stream should be at least 1000 ppm.

The amount (flow rate) of reagent introduced into the flue gas stream is preferably adjusted to provide a molar ratio of urea:NO (i.e., urea in the reagent:NO in the gas stream) within the range of from about 0.1:1 urea:NO to about 10:1 urea:NO and more preferably within the range of from about 0.2:1 urea:NO to about 5:1 urea:NO and most preferably within the range of from about 0.5:1 urea:NO to about 3:1 urea:NO.

The molar ratio of urea to NO is preferably slightly less than or greater than stoichiometric (i.e., +/−20% of stoichiometric, which is about 2:1 urea:NO—see reaction (1) above), so as to minimize the formation of unwanted reaction byproducts, e.g., ammonia ($NH_3$) in the treated flue gas stream. More preferably, the reagent is introduced into the flue gas stream in an amount that provides at least a stoichiometric molar amount of urea for reaction with the NO in the flue gas stream being treated.

The urea—hydrogen peroxide treatment method of this invention is primarily directed to removal of $NO_X$ in the treated flue gas stream and, as noted above, an excess of hydrogen peroxide (with respect to the urea reagent component) may be employed in the present invention. Any unreacted hydrogen peroxide excess that remains after reaction of the urea with $NO_X$ is also available to react with other contaminants in the flue gas stream, e.g., $SO_X$, particularly $SO_3$, converting them to less objectionable or more readily removed species.

Reagent pH

The aqueous solution containing urea and hydrogen peroxide that is employed as the reagent in the method of this range typically has a solution pH that is slightly acidic, e.g., in the range of about pH 3.5 to about pH 5.5. As mentioned previously, the slightly acidic pH values of aqueous solutions containing urea and hydrogen peroxide is beneficial for promoting stability of the hydrogen peroxide in solution against decomposition.

In contrast to the slightly acidic pH range of aqueous solutions containing the urea-hydrogen peroxide reagent of this invention, aqueous ammonia solutions (the preferred reducing agent conventionally employed in SNCR and SCR $NO_X$ treatment systems) are alkaline, having pH values in the range of about pH 11-12. The pH of solutions containing both ammonia and hydrogen peroxide are likewise alkaline, typically in the range of about pH 10-11, and such alkaline pH ranges (unlike acidic pH values) are detrimental to the stability of hydrogen peroxide.

Injection of Reagent into Flue Gas Stream

The aqueous solution (or aqueous medium) containing urea and hydrogen peroxide may be injected into the $NO_X$-containing flue gas stream using conventional injection equipment normally used for introducing an aqueous solution or aqueous slurry into a gas stream.

The aqueous solution is preferably injected, i.e., introduced, into the flue gas stream as fine liquid streams or, preferably, as a spray, such as atomized droplets, through one or more spray nozzles. The spray nozzles or other introduction means (e.g., perforated pipe) should be designed to provide uniform dispersal and good mixing of the aqueous solution containing urea and hydrogen peroxide into the $NO_X$-containing flue gas stream, to facilitate reaction with the gaseous $NO_X$ in the gas stream.

The atomized spray of aqueous reagent solution is believed to be quickly vaporized when contacted with the hot flue gas stream upon being injected into the flue gas stream. The reaction between the reagent (urea and hydrogen peroxide) and nitrogen oxide in the flue gas stream is believed to occur very quickly, but the exact mechanism of reaction is not known nor whether the reaction involves (in part) absorption of NO into the liquid droplets introduced into the flue gas stream during the injection procedure.

In the case of extremely hot flue gas streams, the injection system design should include provisions for ensuring that the hydrogen peroxide contained in the aqueous solution does not become prematurely heated or overheated (and vulnerable to decomposition) prior to its introduction into the hot flue gas stream.

As mentioned earlier, the reagent components, urea and hydrogen peroxide, are injected or otherwise introduced into the flue gas stream concurrently and preferably in combination with each other. The reagent is preferably in aqueous form, e.g., preferably as an aqueous solution containing urea and hydrogen peroxide.

The urea and hydrogen peroxide reagent components are preferably combined prior to their injection or introduction into the flue gas stream, but, alternatively, the urea and hydrogen peroxide components may be introduced separately but concurrently into the flue gas stream being treated provided that good mixing of the two reagent components is ensured. Separate aqueous streams containing, respectively, urea and hydrogen peroxide may be introduced concurrently into the flue gas stream being treated, with mixing of the two components being effected in the flue gas stream.

Such concurrent introduction of the two component streams may be accomplished using separate nozzle systems for each component or by using individual nozzles that have separate internal channels for spraying the two liquid streams concurrently as atomized droplets of each which become intermixed in the flue gas stream. This procedure of introducing the two component streams concurrently has the advantage of permitting quick and easy adjustment of the molar ratio of urea:$H_2O_2$, as may be needed, to compensate for changes in the flue gas composition or other gas stream characteristics.

The reagent may also be introduced into the flue gas stream being treated in solid form, e.g., powdered or particulate carbamide peroxide or urea, or as an aqueous medium that also contains solids, e.g., as an aqueous slurry containing urea and hydrogen peroxide (the slurry containing urea solids, dissolved urea and aqueous hydrogen peroxide.)

Although the carbamide peroxide or urea components of the reagent may be introduced as a powdered solid or as an aqueous slurry (in particulate and partially solubilized form), they are preferably introduced into the flue gas stream being treated as an aqueous solution (completely solubilized) and more preferably is in an aqueous solution containing urea and hydrogen peroxide.

The hydrogen peroxide is preferably utilized as an aqueous hydrogen peroxide solution and is normally introduced into the flue gas stream as such, preferably in combination with the urea in the same aqueous solution.

Operating Temperature

The $NO_X$ treatment method of this invention using the urea-hydrogen peroxide reagent is normally carried out with flue gas stream temperatures ranging from about 300° C. to about 800° C., without need for a catalyst such as is used in conventional SCR $NO_X$ operations that utilize a catalyst in order to operate at temperatures below 800° C. Flue gas stream temperatures are preferably within the range of from about 350° C. to about 750° C., more preferably within the range of from about 350° C. to about 650° C., still more preferably within the range of about from 350° C. to about 600° C., and most preferably within the range of from about 400° C. to about 550° C. for urea-hydrogen peroxide treatment method of this invention.

In general, special gas temperature adjustments (i.e., heating or cooling steps) are not required for the flue gas stream as a prerequisite of the urea-hydrogen peroxide $NO_X$ treatment of this invention. The urea-hydrogen peroxide injection, in the present invention, may be carried out by locating the injection point in the combustion gas stream at a suitable point where the gas stream temperature is within the desired temperature range, e.g., upstream of an economizer and downstream from the combustion unit in the flue gas stream ducting from an electric utility power plant.

The method of the present invention may be carried out with existing SNCR-treated flue gas streams, which are typically operated at temperatures well in excess of 800° C. Since the inventive method allows operation at lower temperature ranges than the very high temperatures conventionally used with SNCR treatments, the flue gas stream may optionally be subjected to a heat exchange step upstream of the SNCR operation to recover heat values from the flue gas stream and thus effect a lowering of the flue gas stream temperature to the preferred operating temperatures ranges employed in this invention, e.g., within a temperature range of from about 300° C. to about 800° C.

Residence Time

Residence time required for reaction of the urea-hydrogen peroxide reagent and $NO_X$, e.g., NO, after injection or introduction of the reagent into the flue gas stream is typically very short, from a fraction of a second, e.g., 0.01 second, to less than a few seconds, e.g., up to about 5 seconds. Preferred residence times for the injected reagent being in contact with the $NO_X$-containing gas stream are generally less than about 2 seconds. The optimum residence time will normally depend on factors such as the temperature of the flue gas stream, with higher gas temperatures generally providing more rapid reaction.

NO Removal Efficiencies

The urea and hydrogen peroxide reagent employed in the method of the present invention is normally capable of reducing the initial NO concentration in the flue gas stream to significantly lower NO concentrations in treated flue gas stream, such that the treated gas stream has a reduced concentration of NO. Sufficient urea and hydrogen peroxide reagent is desirably employed in the method of this invention to reduce the NO concentration in the flue gas stream to less than about 60% of its initial concentration, prior to treatment according to this invention. Preferably, the urea and hydrogen peroxide reagent treatment is sufficient to reduce the NO present in the treated flue gas stream to less than about 50%, and more preferably less than about 40%, of its initial concentration in the flue gas stream prior to treatment.

The urea and hydrogen peroxide reagent employed in the method of the present invention is preferably utilized in a selective non-catalytic reduction operation to achieve these removal efficiencies.

Optional Desulfurization

The present invention for reducing $NO_X$ in $NO_X$-containing flue gas streams may also be employed in conjunction with desulfurization operations, for reducing the concentration of or substantially removing $SO_X$, e.g., $SO_2$ and/or $SO_3$, that are usually also present in $NO_X$-containing flue gas streams.

Such optional desulfurization unit operations may be carried out either upstream or downstream of the $NO_X$ treatment method of the present. Preferably, the desulfurization is carried out on the $NO_X$-depleted flue gas stream at a location downstream of the urea-hydrogen peroxide treatment method of the present invention. This is particularly so in the case of wet desulfurization operations being employed, since exiting flue gas stream temperatures are significantly reduced upon passage through wet scrubbers or absorbers.

The $SO_X$ in combustion flue gas streams is primarily sulfur dioxide ($SO_2$) and sulfur trioxide ($SO_3$). These $SO_X$ components are normally formed during the combustion of sulfur-containing (sour) fuels, such as coal, coke or oil, and the flue gas streams that result from burning such sulfur-containing fuels, whether low-sulfur or high sulfur, consequently contain $SO_X$ contaminants.

Sulfur dioxide is the predominant $SO_X$ component in flue gas streams, with sulfur trioxide. $SO_3$, being produced in much smaller quantities than $SO_2$. Concentrations of $SO_2$ in flue gas streams from coal fired boilers are typically substantial, e.g. about 0.01 vol. % to about 0.5 vol. % $SO_2$, with about 0.05 vol. % to about 0.3 vol. % $SO_2$ being typical.

Typical concentrations of $SO_3$ in flue gas streams from coal fired boilers are about 10 ppm to about 30 ppm (by volume) $SO_3$. Conventional pollution control operations to remove $NO_X$ components from a flue gas stream, e.g., via selective catalytic reduction (SCR), often result in an unwanted increased concentration of $SO_3$, formed by the catalytic oxidation of $SO_2$ in the flue gas stream during SCR treatment, to levels that can double those normally present, e.g., to about 20 to about 60 ppm or more $SO_3$. Likewise, the presence of catalytic metals, e.g., vanadium or nickel, in some fuels can also result in the generation of additional sulfur trioxide.

These $SO_X$ contaminants are desirably removed, or their concentrations reduced, in the combustion flue gas stream via desulfurization procedures, prior to the flue gas stream being released into the atmosphere. Such desulfurization operations are readily incorporated into an integrated air pollution control system that utilizes the present invention for $NO_X$ removal, in the treatment of a $NO_X$- and $SO_X$-containing combustion flue gas stream.

Desulfurization processes for removing $SO_2$ and/or $SO_3$ are well known in the air pollution control field. Gas-liquid contactors or absorbers are widely used to remove $SO_2$ from waste flue gas streams, using an alkaline reagent-containing aqueous medium, e.g., in wet scrubbing systems utilizing lime, limestone or soda ash (sodium carbonate). Conventional techniques for specific treatment of flue gas streams to reduce $SO_3$ concentrations employ alkali reagents in wet scrubbing, slurry injection or dry sorbent injection procedures. Some prior art desulfurization procedures are effective for removing both $SO_2$ and $SO_3$.

The present invention may be adapted for use with many conventional desulfurization systems, whether employed to remove $SO_X$ components generally or $SO_2$ or $SO_3$ specifically. When used in conjunction with the present invention, such desulfurization systems are preferably located downstream, for desulfurization of the $NO_X$-depleted flue gas stream resulting from treatment according to the present invention. Wet desulfurization systems are preferred for use in conjunction with the present invention, particularly wet scrubbing desulfurization systems that employ lime, limestone or soda ash.

Upstream desulfurization may be desirable in situations where flue gas streams contain high concentrations of $SO_3$. Injection of a dry soda-type sorbent or slurried soda-type sorbent can be used to remove a significant portion of $SO_3$ upstream of the urea—hydrogen peroxide treatment of a $NO_X$- and $SO_X$-containing flue gas stream according to the present invention.

The following non-limiting EXAMPLES illustrate preferred embodiments of the present invention.

EXAMPLE 1

Examples 1-3 utilized the following laboratory apparatus. The lab set-up included a pre-heater consisting of a quartz tube heated by a Lindberg tube furnace; an insulated heated tube reactor (diameter: 10 mm, length: 1,200 mm); and auxiliary equipment including a syringe pump, temperature controllers, gas flow meters, gas distribution panel, cold trap, and mist catcher.

A gas mixture consisting of NO, $O_2$, and $N_2$ was introduced as a gas stream first into the pre-heater and then into the insulated heated tube reactor heated to a predetermined temperature. The gas components of the gas mixture were sourced from nitrogen gas, air, and NO in nitrogen (390 ppm NO in $N_2$). Concentrations of each component in the gas mixture were adjusted by a flow rate meter.

An injection inlet was provided at a position at the entrance to (upstream of) the insulated heated tube reactor, and aqueous urea-$H_2O_2$ reagent solutions were injected into the flowing gas stream through a stainless steel tube with a diameter of 1.0 mm.

Concentrations of NO and $NO_2$ (together constituting $NO_X$) in the effluent gas downstream of the insulated heated tube reactor, at the tube reactor outlet, were measured by a chemiluminescence $NO_X$ analyzer. Inlet gas compositions were measured as the composition of the gas stream at the outlet initially at the beginning of each study, prior to reagent being introduced. The accuracy of the initial outlet composition readings was also verified by bypassing the incoming gas stream directly to the $NO_X$ analyzer, without passing the gas stream through the preheater and reactor.

Example 1 studied the effect of using varying amounts of carbamide peroxide reagent relative to the amount of NO in the gas stream. Five different molar ratios of reagent to NO in the inlet gas stream were used to study the reagent concentration effect (relative to the NO) on the removal of NO from the gas stream.

In Example 1, the aqueous solution of the reagent was prepared by dissolution of carbamide peroxide, a solid adduct of urea and hydrogen peroxide, in water to prepare an aqueous solution that contained 5.0 wt. % carbamide peroxide, i.e. corresponding to 3.2 wt. % urea and 1.8 wt. % $H_2O_2$.

The molar ratio of urea:hydrogen peroxide in this aqueous reagent solution was 1:1 since urea and $H_2O_2$ are present in a 1:1 molar ratio in the carbamide peroxide adduct. Consequently, the molar ratios of (i) urea to NO and of (ii) hydrogen peroxide to NO were the same in each of the five runs for this Example 1 (see col. 1 of Table 2 below).

Temperature of the gas stream in the tube reactor was 465° C. The gas stream flow rate was 3.2 L/min.

Table 2 summarizes the results for the five operating runs, with the tube reactor inlet and outlet NO concentrations being shown along with the percentage NO reduction achieved.

Not shown in the tabulated data in Table 2 is the observation that essentially no $NO_2$ was formed in the treated gas stream, a conclusion based on $NO_2$ measurements of the outlet gas stream (see Example 7, below).

TABLE 2

| Molar ratio of urea:NO and of $H_2O_2$:NO | Inlet NO (ppm) | Outlet NO (ppm) | NO Reduction (%) |
| --- | --- | --- | --- |
| 0.5 | 113 | 65 | 43 |
| 1.1 | 116 | 57 | 51 |
| 1.6 | 112 | 42 | 63 |
| 2.1 | 120 | 40 | 67 |
| 3.2 | 120 | 44 | 63 |

Note
re column 1: because the molar ratio of urea:$H_2O_2$ in the carbamide peroxide adduct was 1:1, the molar ratio of urea:NO was the same as that of $H_2O_2$:NO.

The data presented in the Table 2 show that the injection of carbamide peroxide aqueous solution into gas stream provided reduction of NO over a range of molar ratios reagent (urea=$H_2O_2$):NO between 0.5:1 to 3.2:1.

The NO removal was good over the range of molar reagent to NO ratios studied, but best removal efficiencies were obtained with a molar excess of urea (=hydrogen peroxide) relative to the NO in the gas stream.

EXAMPLE 2

Example 2 studied the effect of using three different urea-to-hydrogen peroxide molar ratios on the removal of NO from a gas stream. The apparatus used for Example 2 was the same as that utilized in Example 1.

In Example 2, the urea (in solid form) or hydrogen peroxide (50% $H_2O_2$ source solution) was combined with carbamide peroxide and water to prepare aqueous solutions containing urea and hydrogen peroxide in three different molar ratios: 1.5:1, 1:1 and 0.67:1 urea:$H_2O_2$ in the aqueous reagent solutions.

All of these aqueous solutions, however, contained 5.0 wt. % urea—hydrogen peroxide reagent, the same solution concentrations of urea and hydrogen peroxide (corresponding to 3.2 wt. % urea and 1.8 wt. % $H_2O_2$) as were used in Example 1.

The molar ratio of $H_2O_2$:NO was kept constant in Example 2 at 2:1 $H_2O_2$:NO, so only the urea was varied with respect to the inlet NO concentration in these studies.

The temperature of the gas stream in the tube reactor was 405° C., somewhat less than the 465° C. used in Example 1. The gas stream flow rate was 3.2 L/min., the same as used in Example 1.

Table 3 summarizes the three operating runs, with the tube reactor inlet and outlet NO concentrations being shown along with the percentage NO reduction achieved.

TABLE 3

| Urea/$H_2O_2$ molar ratio | Inlet NO (ppm) | Outlet NO (ppm) | NO Reduction (%) |
| --- | --- | --- | --- |
| 0.67 | 122 | 65 | 47 |
| 1.0 | 120 | 53 | 56 |
| 1.5 | 121 | 46 | 62 |

The results shown in Table 3 indicate that the best NO reduction was obtained using a molar excess of urea, relative to the hydrogen peroxide.

EXAMPLE 3

Example 3 studied the effect of gas stream temperature on the removal of NO from a gas stream, under otherwise fixed operating conditions, using the same urea-to-hydrogen peroxide molar ratio and hydrogen peroxide to NO molar ratio in each of the six temperature studies.

The apparatus used for Example 3 was the same as that utilized in Examples 1 and 2.

In Example 3, as in Example 1, the aqueous solution of the reagent was prepared by dissolution of carbamide peroxide, a solid adduct of urea and hydrogen peroxide, in water to prepare an aqueous solution that contained 5.0 wt. % carbamide peroxide, corresponding to 3.2 wt. % urea and 1.8 wt. % $H_2O_2$.

The molar ratio of urea to hydrogen peroxide in the aqueous reagent solution was therefore 1:1 urea:$H_2O_2$, as was the case in Example 1. The aqueous reagent solution was introduced into the gas stream in an amount that provided 2 moles of hydrogen peroxide to each mole of NO in the inlet gas stream. The ratio of urea to NO was likewise 2:1 urea:NO.

In Example 3, studies were carried out at six different gas stream temperatures ranging from 330° C. to 545° C.

Table 4 summarizes the six operating runs at gas temperatures ranging from 330° C. to 545° C., with the tube reactor inlet and outlet NO concentrations being shown along with the percentage NO reduction achieved.

TABLE 4

| Gas Stream Temperature (° C.) | Inlet NO (ppm) | Outlet NO (ppm) | NO Reduction (%) |
| --- | --- | --- | --- |
| 330 | 121 | 97 | 20 |
| 405 | 120 | 53 | 56 |
| 445 | 123 | 49 | 60 |
| 465 | 120 | 46 | 62 |
| 505 | 121 | 44 | 64 |
| 545 | 122 | 43 | 65 |

The results shown in Table 4 indicate that the good NO reduction was obtained within the temperature range of 405° C. to 545° C., under the specific urea:$H_2O_2$ and $H_2O_2$:NO molar ratios employed in these studies.

The NO removal obtained at the lowest temperature, 330° C., was much lower than that obtained at temperatures above 400° C., which suggests that the hydrogen peroxide was not sufficiently activated to providing the good NO removal results obtained at higher gas stream temperatures.

EXAMPLE 4

Comparative Example 4 studied the effect of using hydrogen peroxide alone, to determine its effectiveness in the removal of NO from a gas stream.

The apparatus used for Comparative Example 4 was the same as that utilized in Example 1. In Comparative Example 4, concentrated aqueous hydrogen peroxide (50 wt. %) was dissolved in water to obtain an aqueous hydrogen peroxide solution containing 5 wt. % $H_2O_2$.

The aqueous hydrogen peroxide solution was injected into the NO-containing gas stream at a rate that provided two moles $H_2O_2$ per mole of NO in the gas stream.

The temperature of the gas stream in the tube reactor was 405° C., and the gas stream flow rate was 3.2 L/min., the latter being the same as used in Example 1.

Figure 1:
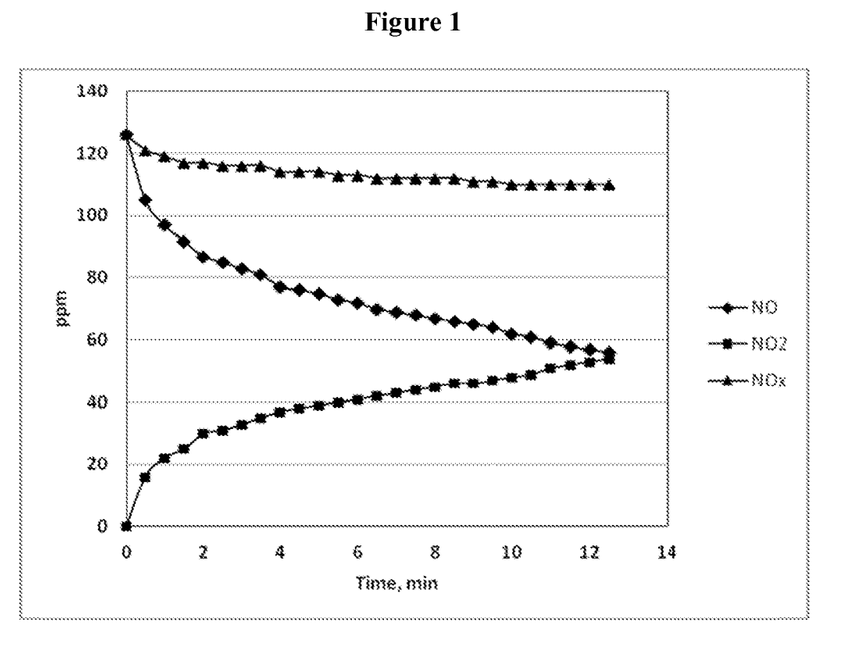
FIG. 1 is a graph that shows the results of the study described in Comparative Example 4, in which hydrogen peroxide alone was used to treat a gas stream containing NO.

FIG. 1 shows the results of this study in Comparative Example 4 using hydrogen peroxide alone, in a graph with the x axis showing time (in minutes, beginning with the initial injection of the reagent at t=0) and the y axis showing NO, $NO_2$ and $NO_X$ (i.e., $NO+NO_2$) concentrations (in ppm) at the outlet of the tube reactor.

The results in FIG. 1 indicate that the hydrogen peroxide was oxidizing NO to $NO_2$ (as would be expected in the presence of an oxidizer), the opposite of the desired objective of reducing NO to $N_2$. It should be noted that the overall level of $NO_X$, the additive concentrations of NO and $NO_2$, remained relatively constant.

While $N_2$ is considered an environmentally benign reaction product, the $NO_2$ reaction product formed in this study using hydrogen peroxide alone as the reactant is normally considered to be an objectionable contaminant, as is NO, in a flue gas stream.

EXAMPLE 5

Example 5 was a laboratory study carried out under the similar conditions and in the same apparatus as in Comparative Examples 4 ($H_2O_2$ alone) except that the reagent utilized in Example 5 was carbamide peroxide, to determine this reagent's effectiveness in the removal of NO from a gas stream.

In Example 5, carbamide peroxide, the solid adduct of urea and hydrogen peroxide containing a mole ratio of 1:1 urea:$H_2O_2$, was dissolved in water to obtain an aqueous solution containing 5.0 wt. % carbamide peroxide, corresponding to 3.2 wt. % urea and 1.8 wt. % $H_2O_2$.

This aqueous urea and hydrogen peroxide solution was injected into the NO-containing gas stream at a rate that provided 2 moles $H_2O_2$ per mole of NO in the gas stream.

The temperature of the gas stream in the tube reactor was 405° C., and the gas stream flow rate was 3.2 L/min., the latter being the same as used in Comparative Example 4.

Figure 2:
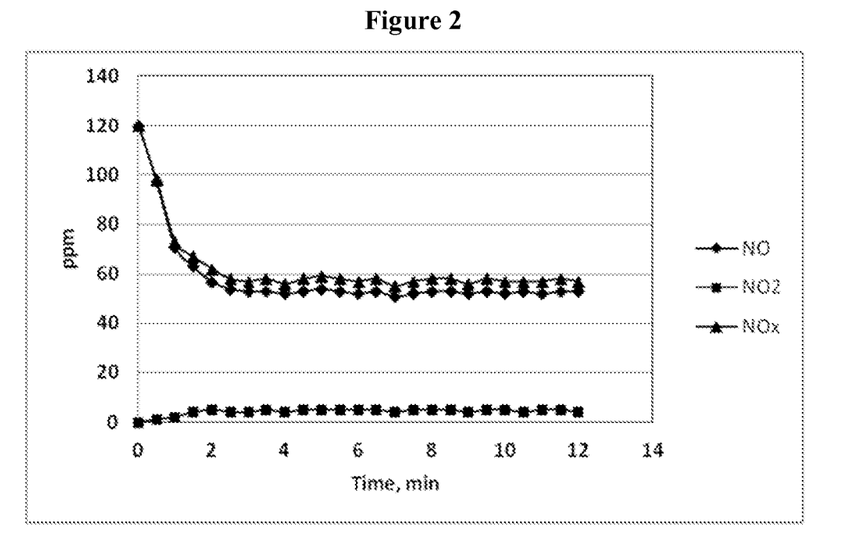
FIG. 2 is a graph that shows the results of the study described in Example 5, in which carbamide peroxide aqueous solution was used to treat a gas stream containing NO.

FIG. 2 shows the results of this study in Example 5 using carbamide peroxide as the reagent, in a graph with the x axis showing time (in minutes, beginning with the initial injection of the reagent at t=0) and the y axis showing NO, $NO_2$ and $NO_X$ (i.e., $NO+NO_2$) concentrations (in ppm) at the outlet of the tube reactor.

The results in FIG. 2 indicate that the urea and hydrogen peroxide in the reagent apparently effected a reduction of NO to $N_2$ (the desired objective). There was only a very small amount of $NO_2$ produced during the run, which strongly suggests that virtually all of the NO being reacted was being converted to $N_2$ (which was not measured). It should be noted that the overall level of $NO_X$, the additive concentrations of NO and $NO_2$, decreased along with the removal of NO.

In contrast to the results obtained in Comparative Example 4, the results for Example 5 demonstrate an unexpected and very significant benefit to the use of a reagent containing carbamide peroxide in effecting conversion of NO in a gas stream to innocuous reaction products.

EXAMPLE 6

Comparative Example 6 studied the effect of using urea alone, to determine its effectiveness in the removal of NO from a gas stream.

The apparatus used for Comparative Example 6 was the same as that utilized in Example 1. In Comparative Example 6, the urea (in solid form) was dissolved in water to obtain an aqueous solution containing 5 wt. % urea.

The aqueous urea solution was injected into the NO-containing gas stream at a rate that provided two moles urea per mole of NO in the gas stream.

The temperature of the gas stream in the tube reactor was 405° C. The gas stream flow rate was 3.2 L/min., the same as used in Examples 1-5.

The results of this study found that there was essentially no change in the NO concentration between the inlet and outlet of the tube reactor, indicating that the urea alone was ineffective for removing or reducing or otherwise affecting the concentration of NO in the gas stream at 405° C.

The procedure was repeated for other gas temperatures, namely, 500° C. and 625° C., with similar outcomes. These results indicated that urea alone was ineffective for removing NO in NO-containing gas streams, particularly within temperature range studied, 400° C. to 625° C.

Figure 3:
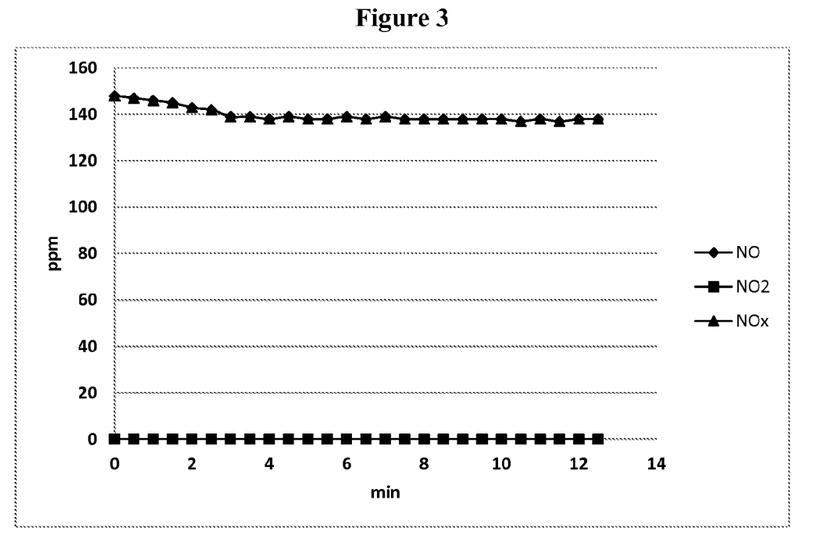
FIGS. 3-7 are graphs that shows the results of the study described in Examples 6 and 7, in which carbamide peroxide (FIGS. 5 and 7) and urea alone (FIGS. 3, 4, and 6), were used to treat gas streams containing NO. The Figures show concentrations of NO, $NO_2$ and NO+$NO_2$ ($NO_X$) in the reagent-treated gas streams as a function of time during the studies.

FIG. 3 shows the results of this study in Comparative Example 6 for the temperature 625° C. using urea as the reagent, in a graph with the x axis showing time (in minutes, beginning with the initial injection of the reagent at t=0) and the y axis showing NO, $NO_2$ and $NO_X$ (i.e., $NO+NO_2$) concentrations (in ppm) at the outlet of the tube reactor. As can be seen from the data, the effect of urea alone on the NO reduction was negligible at 625° C.

It should be noted that these temperatures are significantly below those normally utilized in commercial SNCR systems that treat NO-containing gas streams, which is believed to explain the lack of any NO removal at the temperatures used in these studies.

EXAMPLE 7

Example 7 was a laboratory study that evaluated and compared the effectiveness of two reagents in the removal of NO from NO-containing gas streams at temperatures of 625° C., 750° C. and 800° C. The two reagents were (1) carbamide peroxide in aqueous solution and, for comparative purposes, (2) urea alone, in aqueous solution.

Example 7 was a carried out under the similar conditions and in the same apparatus as in Comparative Example 4 ($H_2O_2$ alone) and 6 (urea alone). The gas stream flow rate was 3.2 L/min.

In this Example 7, the reagent was obtained by dissolution of carbamide peroxide in water to obtain an aqueous solution containing 5.0 wt. % carbamide peroxide, corresponding to 3.2 wt. % urea and 1.8 wt. % $H_2O_2$, as was done in Example 5.

Likewise for this Example 7, the comparative urea reagent was obtained by dissolution of urea (in solid form) in water to obtain an aqueous solution containing 5 wt. % urea, as was done in Comparative Example 6.

The respective reagents, aqueous urea—hydrogen peroxide solution and aqueous urea solution, were injected into the NO-containing gas stream at rates that provided 2 moles urea per mole of NO in the gas stream (also corresponding to 2 moles $H_2O_2$ per mole of NO in the case of the carbamide peroxide reagent.)

Temperature=625° C.

Figure 4:
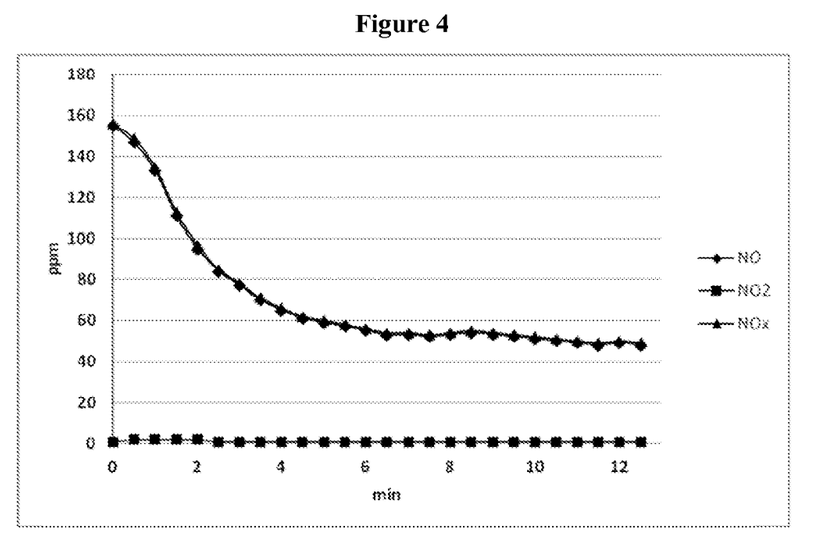

FIG. 4 shows the results of the study in Example 7 at the temperature of 625° C. using aqueous carbamide peroxide solution as the reagent, in a graph with the x axis showing time (in minutes, beginning with the initial injection of the reagent at t=0) and the y axis showing NO, $NO_2$ and $NO_X$ (i.e., $NO+NO_2$) concentrations (in ppm) at the outlet of the tube reactor.

The results in FIG. 4 indicate that the urea and hydrogen peroxide in the reagent reduced the NO concentration in the gas stream at 625° C. from an initial value of about 157 ppm NO to about 44 ppm NO, as shown by the data obtained after six minutes into the run, and to about 80 ppm NO (a 72% reduction), as shown by the data obtained after 12 minutes into the run.

Negligible $NO_2$ was produced during this run at 625° C. (see the lower curve in FIG. 4), which strongly suggests that virtually all of the NO being reacted was being converted to $N_2$ (which was not measured). It should be noted that the overall level of $NO_X$, the additive concentrations of NO and $NO_2$, decreased along with the removal of NO.

FIG. 3 shows the results of the comparative study in Example 6 using aqueous urea solution as the reagent at the same temperature of 625° C. A comparison of the data in FIG. 3 and FIG. 4 shows that urea alone cannot provide reduction of NO at this temperature, whereas carbamide peroxide demonstrated a successful NO reduction.

Temperature=725° C.

Figure 5:
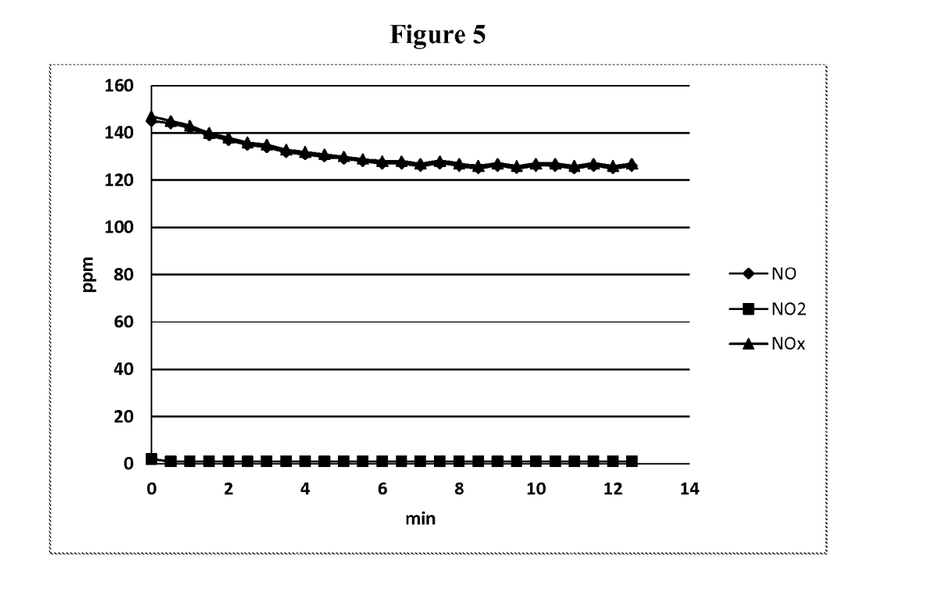

FIG. 5 shows the results of the comparative study in Example 7 using aqueous urea solution as the reagent at the third temperature of 725° C., in a graph with the x axis showing time (in minutes, beginning with the initial injection of the reagent at t=0) and the y axis showing NO, $NO_2$ and $NO_X$ (i.e., $NO+NO_2$) concentrations (in ppm) at the outlet of the tube reactor.

The results of this study shown in FIG. 5 demonstrated that there was only a slight decrease in the NO concentration between the inlet and outlet of the tube reactor. The NO concentration was reduced from an initial value of about 145 ppm NO to about 125 ppm NO (a 14% reduction), as shown by the data obtained after nine minutes into the run at 725° C.

These results indicate that the urea alone was ineffective for achieving a significant reduction in the NO concentration of the gas stream at 725° C. The lower curve in FIG. 5 indicates that no $NO_2$ was formed during this study. Temperature=800° C.

Figure 6:
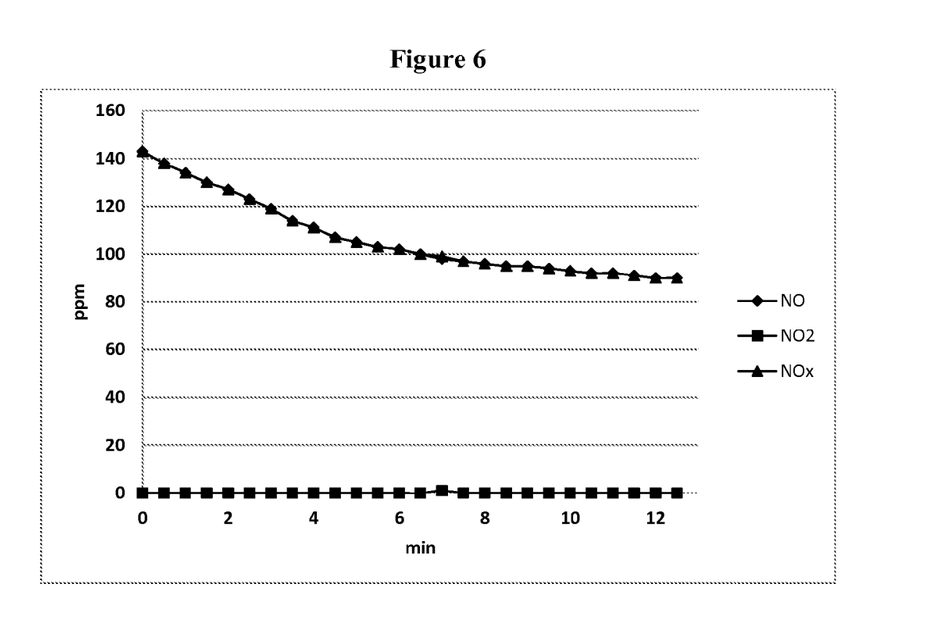

FIG. 6 shows the results of the comparative study in Example 7 using aqueous urea solution as the reagent at the temperature of 800° C., in a graph with the x axis showing time (in minutes, beginning with the initial injection of the reagent at t=0) and the y axis showing NO, $NO_2$ and $NO_X$ (i.e., $NO+NO_2$) concentrations (in ppm) at the outlet of the tube reactor.

The results of this study shown in FIG. 6 demonstrated that there was only a moderate decrease in the NO concentration between the inlet and outlet of the tube reactor. The NO concentration was reduced from an initial value of about 140 ppm NO to about 90 ppm (a 36% reduction) after 12 minutes into the run, as shown by the data in FIG. 6.

Figure 7:
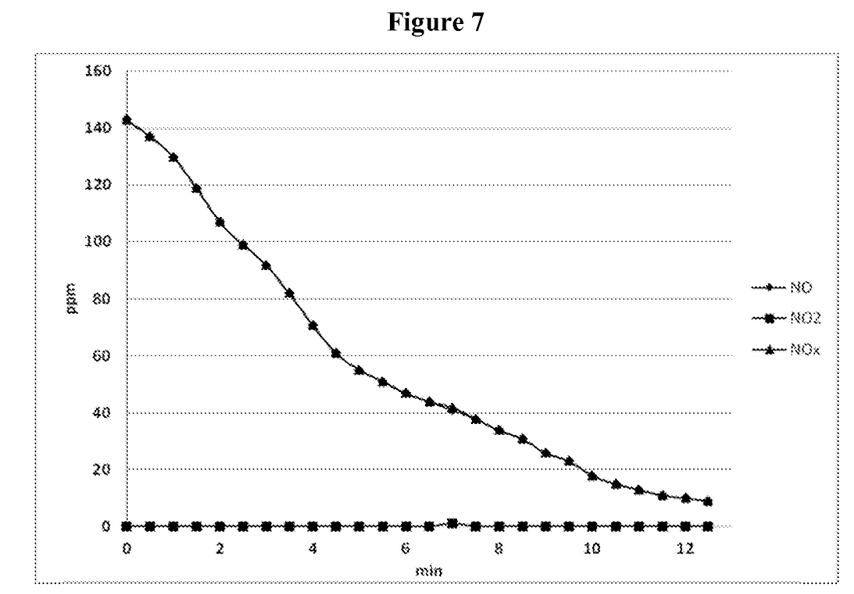

FIG. 7 shows the results of the study in Example 7 at the temperature of 800° C. using aqueous carbamide peroxide solution as the reagent, in a graph with the x axis showing time (in minutes, beginning with the initial injection of the reagent at t=0) and the y axis showing NO, $NO_2$ and $NO_X$ (i.e., $NO+NO_2$) concentrations (in ppm) at the outlet of the tube reactor.

The results in FIG. 7 indicate that the urea and hydrogen peroxide in the reagent effected a significant reduction in the NO concentration in the gas stream at 800° C., much more dramatic than the results in the previous runs at lower temperatures. The carbamide peroxide aqueous reagent reduced the NO in the gas stream from an initial value of about 140 ppm NO to about 10 ppm (a 93% reduction) after 12 minutes into the run, as shown by the data in FIG. 7.

Negligible $NO_2$ was produced during this run at 800° C. (see the lower curve), which strongly suggests that virtually all of the NO being reacted was being converted to $N_2$ (which was not measured). It should be noted that the overall level of $NO_X$, the additive concentrations of NO and $NO_2$, decreased along with the removal of NO.

These results indicate that the urea alone (FIG. 6) was ineffective for achieving a significant reduction in the NO concentration of the gas stream at 800° C., especially when compared with the results obtained with the carbamide peroxide aqueous reagent at 800° C. (FIG. 7).

EXAMPLE 8

Example 8 studied the effect of water concentration in the gas stream on the NO reduction efficiency. Five different molar ratios of water to reagent in the inlet gas stream were used to study the water concentration effect (relative to the carbamide peroxide) on the removal of NO from the gas stream.

The apparatus used for Example 8 was the same as that utilized in Examples 1-7.

In Example 8, as in Example 1, the aqueous solution of the reagent was prepared by dissolution of carbamide peroxide in water to prepare an aqueous solution that contained different concentrations of carbamide peroxide.

The molar ratio of urea to hydrogen peroxide in the aqueous reagent solution was therefore 1:1 urea:$H_2O_2$, as was the case in Example 1. The aqueous reagent solution was introduced into the gas stream in an amount that provided 2.1 moles of hydrogen peroxide to each mole of NO in the inlet gas stream. The ratio of urea to NO was likewise 2.1:1 urea:NO.

In Example 8, studies were carried out at five different water:reagent molar ratios ranging from 5:1 to 200:1.

Table 5 summarizes the five operating runs at gas temperature of 465° C., with the water to reagent molar ratios being shown along with the percentage NO reduction achieved.

TABLE 5

| Reagent/NO molar ratio | Water/reagent molar ratio | Temperature (° C.) | NO Reduction Efficiency, % |
|---|---|---|---|
| 2.1 | 5 | 465 | 11 |
| 2.1 | 15 | 465 | 30 |
| 2.1 | 50 | 465 | 48 |
| 2.1 | 100 | 465 | 67 |
| 2.1 | 200 | 465 | 71 |

\* Reagent is carbamide peroxide
\*\* All other process parameters were identical.

The data in the Table 5 suggest that water indeed plays an active role in the NO reduction. Percentage of NO reduction increased with increase of water to reagent molar ratio.

EXAMPLE 9

Example 9 studied the typical gas compositions in the reduction experiments using carbamide peroxide. For five runs at different experimental conditions the concentrations of injected urea, hydrogen peroxide, and water in the gas stream were calculated. NO concentrations in the inlet and outlet gas stream were measured and NO reduction was determined.

Table 6 summarizes the five runs at different conditions, with the reagent concentration of 5.0 wt %. The concentrations of the components in the gas stream are shown along with the percentage NO reduction achieved.

TABLE 6

| Reagent concen- tration, wt. % | Concentration in the Gas Stream | | | | Temper- ature (° C.) | NO Reduction Efficiency, % |
|---|---|---|---|---|---|---|
| | NO, ppm | Urea, ppm | $H_2O_2$, ppm | $H_2O$, vol % | | |
| 5.0 | 120 | 240 | 240 | 2.4 | 330 | 20 |
| 5.0 | 120 | 240 | 240 | 2.4 | 465 | 56 |
| 5.0 | 120 | 250 | 250 | 2.5 | 465 | 67 |
| 5.0 | 110 | 180 | 180 | 1.8 | 465 | 63 |
| 5.0 | 115 | 125 | 125 | 1.3 | 465 | 51 |

\*Reagent is carbamide peroxide
\*\* All other process parameters were identical.

The data in the Table 6 suggest that concentration of the active species (Urea and $H_2O_2$) in the gas stream in all our Examples were higher than 100 ppm. Generally, higher concentrations of carbamide peroxide provide a more efficient removal of NO from the gas stream.

EXAMPLE 10

Figure 8:
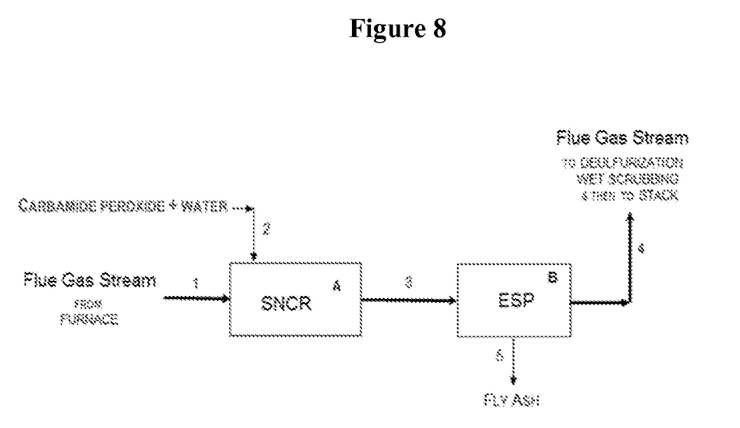
FIG. 8 is a schematic flow diagram illustrating a preferred embodiment of the combustion flue gas $NO_X$ treatment process of this invention that is described in Example 10.

Example 10 illustrates the application of a preferred embodiment of the present invention to the $NO_X$ treatment of a flue gas stream from a combustion boiler utilizing high sulfur coal. The process is operated continuously, and normal steady state conditions are assumed for purposes of Example 10. FIG. 8 illustrates a schematic flow diagram of this preferred embodiment; reference numerals and letters in FIG. 8 are included in the process description which follows. References to gaseous component concentrations in percentage (%), parts per million (ppm) or parts per billion (ppb) refer to such concentrations on a volume basis.

The coal used in the combustion unit of this Example 10 is high sulfur coal containing 2 wt. % sulfur. The combustion furnace is operated with preheated air, and it is assumed that there is 1% conversion of the sulfur in the coal to $SO_3$ in flue gas from the combustion unit. The exit combustion flue gas stream 1 contains about 420 ppm $NO_X$, i.e., 400 ppm NO and about 20 ppm $NO_2$, and also about 900 ppm $SO_2$ and about 9 ppm $SO_3$.

Referring now to FIG. 8, the combustion flue gas stream 1 is passed through a heat exchange unit (not shown in FIG. 8) that reduces the temperature of the hot combustion flue gas stream 1 to about 900° F. (482° C.). The reduced-temperature flue gas stream 1 has essentially the same composition as prior to its being subjected to a heat exchange unit operation.

The flue gas stream 1 is then treated in a selective non-catalytic reduction reactor A to reduce its $NO_X$ content. The flue gas stream is reacted in the selective non-catalytic reduction (SNCR) unit operation with an aqueous reagent solution 2 that contains water and carbamide peroxide. The aqueous reagent solution 2 contains 6.4 wt. % urea and 3.6 wt. % hydrogen peroxide (providing a mole ratio of 1:1 urea:$H_2O_2$ in the reagent solution) and is prepared (not shown in FIG. 8) by dissolution of appropriate amounts of solid carbamide peroxide in water.

The aqueous reagent solution 2 containing water and carbamide peroxide is introduced into the flue gas stream 1 via a set of injection nozzles (not shown in FIG. 8) that spray and disperse the solution into the hot flue gas stream in the SNCR reaction apparatus A. Sufficient aqueous reagent solution 2 is introduced into the flue gas stream 1 in the SNCR reactor A to provide 2 moles of urea per mole NO in the flue gas stream. The amount of urea in the injected aqueous reagent solution 2 thus provides a stoichiometric amount of urea required to react with the NO that is contained in the flue gas stream 1.

The reduction reaction of the urea—hydrogen peroxide reagent solution 2 with $NO_X$ in the flue gas steam 1 in the SNCR reactor A reduces the NO content of the flue gas stream 2, producing $N_2$, $CO_2$ and water in the flue gas stream 3 that exits the SNCR reactor A. The flue gas stream 3 exiting from the SNCR unit operation A contains about 900 ppm $SO_2$ and about 9 ppm $SO_3$ and reduced levels of $NO_X$, about 150 ppm $NO_X$.

The flue gas stream 3 exiting from the SNCR reactor A is directed to one or more electrostatic precipitators (ESP), shown as block B labeled as ESP in FIG. 8, to remove entrained solids, i.e., particulates such as fly ash from the coal combustion, from the flue gas stream 3. The solids-free ESP-treated flue gas exits the electrostatic precipitator operation B as flue gas stream 4. The ESP solids, removed as stream 5, are disposed of in a landfill.

The ESP-treated flue gas stream 4 has a reduced $NO_X$ content, as compared with the combustion flue gas stream 1 upstream of the SNCR reactor A: the flue gas stream 4, downstream of the ESP operation B, contains about 150 ppm $NO_X$, compared to about 420 ppm $NO_X$ in the untreated combustion flue gas stream 1 upstream of the SNCR reactor A.

The $SO_X$-containing flue gas stream 4 exiting from the ESP operation B is next subjected to a wet scrubbing desulfurization procedure (not shown in FIG. 8) to reduce its $SO_2$ and $SO_3$ content before the flue gas stream 4 is vented to the atmosphere. Wet desulfurization scrubbing operations using an alkali such as lime, limestone or soda ash, are well known procedures for desulfurizing $SO_X$-containing flue gas streams.

It will be appreciated by those skilled in the art that changes could be made to the embodiments described above without departing from the broad inventive concept thereof. It is understood, therefore, that this invention is not limited to the particular embodiments disclosed but is intended to cover modifications within the spirit and scope of the present invention as defined by the appended claims.

What is claimed is:

1. A method of removing nitrogen oxides from a flue gas stream comprising introducing a reagent comprising carbamide peroxide and water into a stationary-source $NO_X$-containing combustion flue gas stream at a temperature between about 300° C. to about 800° C. in an amount sufficient to react with NO in the flue gas stream, to yield a flue gas stream having a reduced concentration of NO.

2. The method of claim 1, wherein the water is an active component of the reduction process and the molar ratio of water to carbamide peroxide is in the range of from about 5:1 to about 500:1.

3. The method of claim 2, wherein the optimal molar ratio of water to carbamide peroxide is in the range of from about 50:1 to about 200:1.

4. The method of claim 1, wherein the carbamide peroxide is introduced into the flue gas stream in an amount that provides a molar ratio of the carbamide peroxide to the NO in the flue gas stream being in the range of from about 0.2:1 to from about 5:1.

5. The method of claim 1, wherein the carbamide peroxide and the water are introduced into the flue gas stream as a combined aqueous solution via one or more spray nozzles.

6. The method of claim 5, wherein the carbamide peroxide and the water are introduced separately and concurrently into the flue gas stream, as a first stream containing solid carbamide peroxide and a second stream containing water.

7. The method of claim 1, wherein the reagent is introduced into the flue gas stream in an amount that provides at least 100 ppm of urea for the reaction with the NO in the flue gas stream being treated.

8. The method of claim 1, wherein the reagent is introduced into the flue gas stream in an amount that provides at least 100 ppm of $H_2O_2$ for the reaction with the NO and urea in the flue gas stream being treated.

9. The method of claim 1, wherein the reagent is introduced into the flue gas stream in an amount that provides at least 1000 ppm of $H_2O$ in the flue gas stream being treated.

10. The method of claim 1, wherein flue gas stream temperature during the carbamide peroxide injection is in the range of from about 350° C. to about 750° C.

11. The method of claim 1, wherein flue gas stream temperature during the carbamide peroxide reagent injection is in the range of from about 400° C. to about 550° C.

12. The method of claim 1, wherein the reagent comprises a mixture of carbamide peroxide, water, and urea.

13. The method of claim 12, wherein the molar ratio of the carbamide peroxide to the urea to the water is in the range of from about 0.25:1:50 to about 20:1:1000.

14. The method of claim 1, wherein the reagent comprises a mixture of carbamide peroxide, water, and $H_2O_2$.

15. The method of claim 14, wherein the molar ratio of the carbamide peroxide to the $H_2O_2$ to the water is in the range of from about 0.5:1:50 to about 10:1:500.

16. The method of claim 1, wherein the reagent is employed as the reducing agent in the absence of a catalyst used in Selective Catalytic Reduction operations carried out on $NO_X$-containing flue gas streams.

* * * * *